United States Patent
Shin et al.

(10) Patent No.: US 8,351,897 B2
(45) Date of Patent: Jan. 8, 2013

(54) MOBILE TERMINAL AND OPERATION METHOD FOR THE SAME

(75) Inventors: Dong Jun Shin, Seoul (KR); Tae Won Um, Seoul (KR); Kyoung Taek Kim, Gyeonggi-do (KR); Hyang Ah Kim, Gyeonggi-do (KR); Kyung Hwa Kim, Seoul (KR)

(73) Assignee: Samsung Electronics Co., Ltd., Samsung-ro, Yeongton-gu, Suwon-si, Gyeonggi-do (KR)

( * ) Notice: Subject to any disclaimer, the term of this patent is extended or adjusted under 35 U.S.C. 154(b) by 151 days.

(21) Appl. No.: 12/838,591

(22) Filed: Jul. 19, 2010

(65) Prior Publication Data

US 2011/0021243 A1    Jan. 27, 2011

(30) Foreign Application Priority Data

Jul. 27, 2009   (KR) .................. 10-2009-0068455

(51) Int. Cl.
*H04M 11/00* (2006.01)
*H04M 1/66* (2006.01)
*H04M 1/68* (2006.01)
*H04M 3/16* (2006.01)
*H04M 11/04* (2006.01)
*H04M 1/00* (2006.01)

(52) U.S. Cl. ..... 455/405; 455/410; 455/411; 455/404.1; 455/404.2; 455/550.1

(58) Field of Classification Search .................. 455/405, 455/410–411, 404.1–404.2, 550.1
See application file for complete search history.

(56) References Cited

U.S. PATENT DOCUMENTS 6,662,023 B1 * 12/2003 Helle ........................... 455/558
7,986,935 B1 * 7/2011 D'Souza et al. .............. 455/406
2002/0052916 A1 * 5/2002 Kloba et al. .................. 709/203
2008/0143518 A1 * 6/2008 Aaron .......................... 340/540

OTHER PUBLICATIONS

Lee, Ching-Hao; Patent Application Publication No: US 2009/0156198 A1; Publication No: Jun. 18, 2009; "Method for Evaluating Mobile Communication Device Utilizing Field Test . . . ;".
Konuma, Ryouhei; Patent Application Publication No: US 2008/0278294 A1; Publication No: Nov. 13, 2008; "Wireless Tag Reader and Wireless Tag Status Inference Apparatus . . . ;".
Cervi, Mark R., et al; Patent Application Publication No: US 2007/0185736 A1; Publication No: Aug. 9, 2007; "Systems, Methods, and Computer Program Products for Facilitating . . . ;".
Sinclair, John; Patent Application Publication No: US 2003/0073461 A1; Publication No: Apr. 17, 2003; "Wireless Communication and Control System;".

* cited by examiner

*Primary Examiner* — Meless N Zewdu
*Assistant Examiner* — Munsoon Choo
(74) *Attorney, Agent, or Firm* — Cha & Reiter, LLC

(57) ABSTRACT

A mobile terminal and operational method may store or output log information related to usage histories according to at least one of a condition, location, and status indicated by situation information. The mobile terminal can be conveniently operated on the basis of past usage histories. The operation method for the mobile terminal includes: creating situation information on the basis of at least one of location information, status information and condition information of the mobile terminal; collecting log information related to usage histories of the mobile terminal from the time of situation information creation or within a preset time after situation information creation; linking the situation information with the log information and storing the linked information; and outputting, when new situation information equal to the stored situation information is created, log information linked to the stored situation information.

17 Claims, 6 Drawing Sheets

FIG. 7

| | GPS INFORMATION | BT CONNECTION INFORMATION | IMAGE INFORMATION | | AUDIO INFORMATION | | LOG INFORMATION | | | |
|---|---|---|---|---|---|---|---|---|---|---|
| | Time | Place | Person | Number | Duration | Type | Song/Playlist | Channel | Folder | URL | Keyword |
| Call | ● | ● | ● | ● | ● | | | | | | |
| Message | ● | ● | ● | ● | | ● | | | | | |
| Email | ● | ● | ● | ● | | ● | | | | | |
| Messenger | ● | ● | ● | | ● | ● | | | | | |
| Music | ● | ● | ● | | | | ● | | | | |
| FM radio | ● | ● | | | ● | | | ● | | | |
| Task | ● | ● | | | | | | | | | |
| Memo | ● | ● | | | | | | | | | |
| Calculator | ● | ● | | | | | | | | | |
| Calendar | ● | ● | | | | | | | | | |
| Alarm | ● | ● | | | | | | | | | |
| My files | ● | | | | | | | | ● | | |
| Browser | ● | ● | | | ● | | | | | ● | |
| RSS feed | | | | | | | | | | | |
| Bluetooth | ● | ● | | | | | | | | | |
| Wi-Fi | ● | ● | | | | | | | | | |
| Map | ● | ● | | | | | | | | | ● |
| Subway map | ● | ● | | | | | | | | | ● |

MOBILE TERMINAL AND OPERATION METHOD FOR THE SAME

CLAIM OF PRIORITY

This application claims the benefit of priority under 35 U.S.C. §119 from a Korean Patent Application No. 10-2009-0068455 filed in the Korean Intellectual Property Office on Jul. 27, 2009, the disclosure of which is hereby incorporated by reference in its entirety.

BACKGROUND OF THE INVENTION

1. Field of the Invention

The present invention relates to a mobile terminal. More particularly, the present invention relates to a mobile terminal and operation method for the same that collects and stores information related to usage of various functions.

2. Description of the Related Art

A mobile terminal supports various user functions beyond voice communication based on mobility. Recently, mobile terminals have entered into widespread use because of convenience combined with the plurality of functions provided in a single piece of portable equipment.

A mobile terminal is equipped with specific functional modules to support various user functions. For example, the mobile terminal may include a file search module for playing back stored image files, an MP3 player module for playing back music files, and a camera module for capturing images. These modules support corresponding user functions that are activated according to explicit control of the user.

A mobile terminal can also have access to various functions and may be a native electronic device without explicit control of the user. Hence, there is a need in the art to develop an operation that enables the user to use a desired one of various services provided by the mobile terminal in a convenient and intelligent manner.

SUMMARY OF THE INVENTION

The present invention provides a mobile terminal and method of operation that collects and stores location information and log information related to usage of various functions by the mobile terminal at specific locations, and offer a user service in a more intelligent manner on the basis of the location information and log information.

In accordance with an exemplary embodiment of the present invention, there is provided a method for providing situational-based functionality a mobile terminal, including: (a) creating situation information by a control unit on a basis of at least one of location information, status information and condition information of the mobile terminal; (b) collecting log information related to usage histories of the mobile terminal from a time situation information is created in (a) or within a preset time subsequent to the creation of situation information in (a); and (c) linking the situation information with the log information and storing the linked information in a storage unit to provide situationally-based functionality.

In an exemplary aspect of the present invention, the method may include that the mobile terminal displays an output of situationally-based functions corresponding to the stored linked information when the mobile terminal subsequently encounters a matching situational information. A matching situational information can include, for example, a matching surrounding, activity, environmental factor, etc.

In accordance with another exemplary embodiment of the present invention, there is provided a mobile terminal including: a situation information collecting unit collecting at least one of location information, status information and condition information of the mobile terminal; a control unit creating situation information on the basis of the information collected by the situation information collecting unit, and collecting log information related to usage histories of the mobile terminal from the time of situation information creation or within a preset time after situation information creation; and a storage unit storing the situation information and log information in a linked form.

According to an exemplary aspect of the present invention, the mobile terminal may readily and accurately identify the location of the user, and may provide the user with an informational item or execute a function in a manner highly correlated with the current location of the mobile terminal.

BRIEF DESCRIPTION OF THE DRAWINGS

The above features and advantages of the present invention will become more apparent from the following detailed description in conjunction with the accompanying drawings, in which:

FIG. 7 illustrates a data block composed of situation information and log information according to an exemplary embodiment of the present invention.

DETAILED DESCRIPTION

Hereinafter, exemplary embodiments of the present invention are described in detail with reference to the accompanying drawings. The same reference symbols are used throughout the drawings to refer to the same or similar parts. Detailed descriptions of well-known functions and structures incorporated herein may be omitted to avoid obscuring appreciation of the subject matter of the present invention by a person of ordinary skill in the art. Particular terms may be defined to describe the invention in the best manner. Accordingly, the meaning of specific terms or words used in the specification and the claims should not be limited to the literal or commonly employed sense, but should be construed in accordance with the spirit of the invention as understood by a person of ordinary skill in the art. The description of the various exemplary embodiments is to be construed as illustrative only and does not describe every possible instance of the claimed invention. Therefore, it should be understood that various changes may be made and equivalents may be substituted that are within the spirit and the scope of the presently claimed invention.

Figure 1:
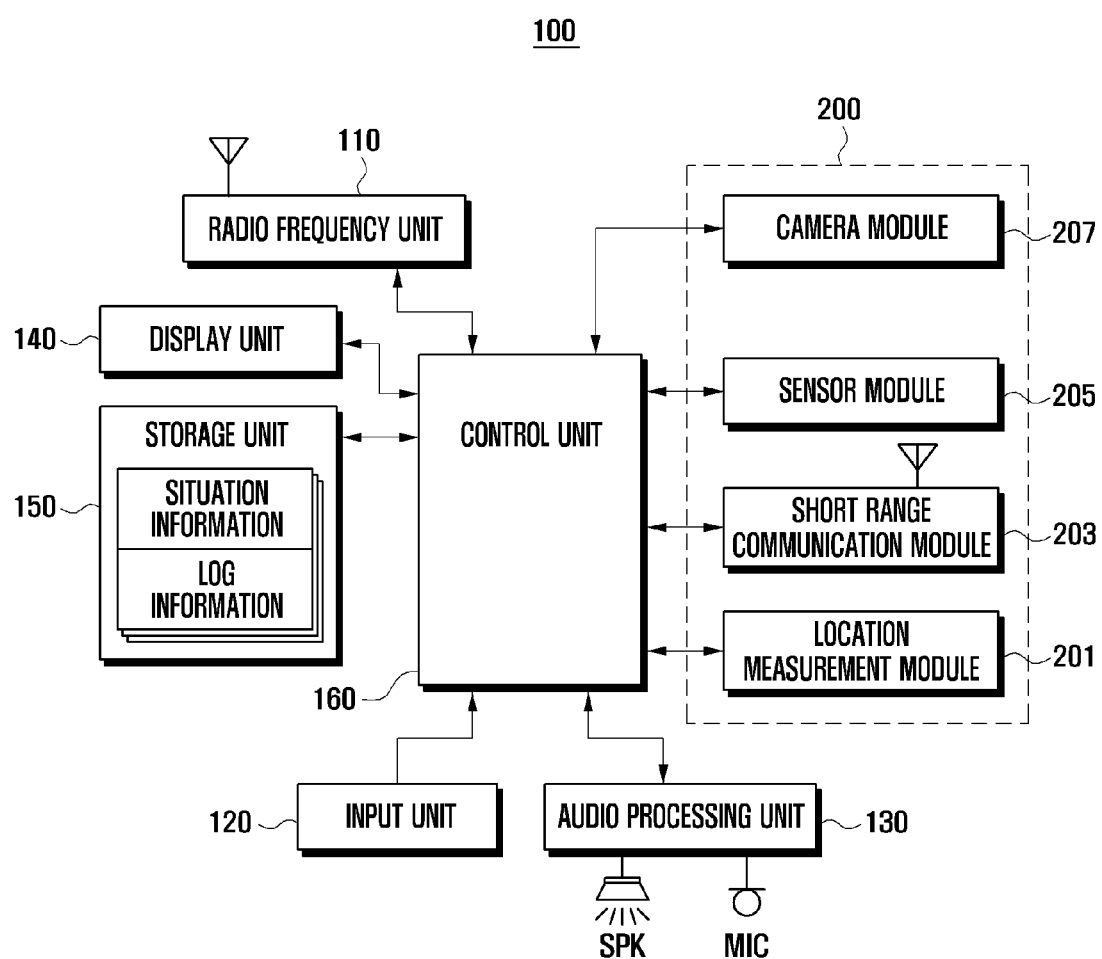
FIG. 1 is a block diagram illustrating a mobile terminal according to an exemplary embodiment of the present invention.

FIG. 1 is a block diagram of a mobile terminal according to an exemplary embodiment of the present invention.

Referring now to FIG. 1, the mobile terminal 100 of the present invention may include, for example, a radio frequency unit 110, an input unit 120, an audio processing unit 130, a display unit 140, a storage unit 150, a situation information collecting unit 200, and a control unit 160.

The mobile terminal 100 having the above exemplary configuration may utilize the situation information collecting unit 200 to collect and store various information related to the location, status, and situation of the mobile terminal 100. In this process, the mobile terminal 100 may engage the services of a location measurement module such as a GPS (Global Positioning System) module to obtain the coordinates of the current location of the mobile terminal, and may use a camera module, a sensor module, or a short-range communication module to collect and store information regarding status of surrounding peripheral devices and/or conditions in the vicinity of the current location. Hence, the mobile terminal 100 may obtain more detailed situation information on the basis of combining coordinate information with the additional information collected from the peripheral devices. While collecting situation information, the mobile terminal 100 may collect, in specific situations, log information regarding utilization of individual functions related to, for example, call placement and reception, music playback and file search, and can store the collected log information in order of occurrence that preferably includes a specific time. Thereafter, when the current location indicates one of the recorded situations, the mobile terminal 100 may output the stored log information. Next, each component is described in detail.

The radio frequency unit 110 may establish a communication channel to a base station for data and voice communication with another mobile terminal. To establish communication, the radio frequency unit 110 may include, for example, a radio frequency transmitter for upconverting the frequency of a signal to be transmitted and amplifying the signal, and a radio frequency receiver for low-noise amplifying a received signal and downconverting the frequency of the received signal. In particular, the radio frequency unit 110 may provide information related to calls made and received at a specific location to the storage unit 150 under the control of the control unit 160. When a location measurement module is not present, the radio frequency unit 110 may support triangulation based on base stations collecting situation information for the mobile terminal 100.

The input unit 120 may include a plurality of alphanumeric and function keys for inputting alphanumeric information and for setting various functions. The function keys may include, for example, direction, side, and shortcut keys associated with specific functions. The input unit 120 may send a key signal input for controlling the operation of the mobile terminal 100 to the control unit 160. In particular, the input unit 120 may generate input signals for activating various functions related to, for example, call handling, playback of moving images or music files, image file search, broadcast reception, camera operation and audio recording according to user actions, and send the input signals to the control unit 160. In such a case, the mobile terminal 100 may further include a broadcast reception module.

Still referring to FIG. 1, the audio processing unit 130 may, for example, under the control of the control unit 160, reproduce an audio signal through a speaker SPK that has been received by the radio frequency unit 110, and transmits an audio signal through the radio frequency unit 110, such as a voice signal received by a microphone MIC. In particular, the microphone MIC may act as an element of the situation information collecting unit 200. That is, the microphone MIC may be activated in response to commands of the control unit 160, and collects an audio signal generated at a specific location and sends the collected audio signal to the control unit 160. Later, the audio signal collected by the microphone MIC may be used to identify a specific location.

The display unit 140 may display various menus, information input by the user, including function setting information, and information to be provided to the user. The display unit 140 may be realized using a liquid crystal display (LCD) devices or organic light emitting diodes (OLED). In addition, any other type of thin-film technology display can be used. When the display unit 140 has a touch screen capability, it may also function as an input unit, thus being a single unit with combined functionality. In particular, the display unit 140 may output various information related to the location of the mobile terminal 100. For example, when the mobile terminal 100 is placed at a particular location, the display unit 140 may display coordinate information corresponding to the location. In addition, when the location is equal to or similar to one of the recorded locations, the display unit 140 may output log information collected at the location. The display unit 140 may output an editable situation information list in response to an input signal from the input unit 120. The screen interface of the display unit 140 is described in more detail later with reference to the drawings.

The storage unit 150 may store programs related to the operation of the mobile terminal 100, and user data. The storage unit 150 may also be arranged so as to include a program area and a data area.

The program area may store, for example, an operating system (OS) for controlling the overall operation of the mobile terminal 100, and application programs for reproducing multimedia content. In particular, the program area may store an application program for activating individual modules of the situation information collecting unit 200, and store an application program for collecting log information from the mobile terminal 100 and for collecting situation information from the situation information collecting unit 200. More specifically, when the situation information collecting unit 200 includes modules such as a camera module 207, a sensor module 205, a short range communication module 203 and a location measurement module 201, the program area may store a situation-based function application program for activating the aforementioned modules (as well as others) and controlling information collection using the modules according to preset conditions. For example, the program area may store an application program that activates the camera module 207 when the mobile terminal is at a specific location, compares image information captured through the camera module 207 with stored information, and produces the comparison results. When the sensor module 205 includes at least one of an acceleration sensor, proximity sensor, ambient light sensor, temperature sensor, humidity sensor, tilt sensor and gyro sensor, the program area may store an application program for operating the included sensor. When the short range communication module 203 comprises a Bluetooth module, the program area may store an application program for operating the Bluetooth module. When the mobile terminal 100 is moved to a location that satisfies a preset condition, the situation-based function application program may cause the mobile terminal 100 to collect log information. Here, the condition may specify a case in which the situation information of the mobile terminal 100 remains the same for a preset time, or a case in which an input signal for selecting a particular location is generated from the input unit 120, or a case in which the mobile terminal 100 remains stationary for a preset time period. The mobile terminal 100 may include an acceleration sensor to detect movement. When a user function is activated to collect log information, the situation-based function application program may cause the mobile terminal 100 to collect situation information. Here, the log information may include various usage information of functions or programs in the mobile terminal 100 related to, for example, call handling, music playback, image file search, and broadcast reception. The situation-based function application program stores the collected situation information and log information together. Later, when the mobile terminal 100 is placed in one of the recorded situations, the situation-based function application causes an output of the log information related to the situation.

The data area is an area that stores data generated by the use of the mobile terminal 100, and may store phonebook information, audio data, content data, and other user data. In particular, the data area stores at least one kind of information collected by the situation information collecting unit 200. For example, when the situation information collecting unit 200 includes a camera module 207 and a location measurement module 201, the data area may store coordinate information collected by the location measurement module 201 at a specific location, and image information collected by the camera module 207 at the location. When the situation information collecting unit 200 includes a location measurement module 201 and a sensor module 205, the data area may store coordinate information collected by the location measurement module 201 at a specific location and sensing information collected by the sensor module 205 at the location. When the situation information collecting unit 200 includes a location measurement module 201 and a short range communication module 203, the data area may store coordinate information collected by the location measurement module 201 at a specific location according to a preset condition and store a connection list created by the short range communication module 203 at the location. Here, when the short range communication module 203 comprises a Bluetooth module, the connection list may be a list of Bluetooth devices discovered in the vicinity of the location through a scanning and pairing procedure. In addition, the data area may store log information regarding usage of various user functions such as a call handling function, camera function, music playback function, file search function, and broadcast reception function. The data area may store the log information and the situation information collected by the situation information collecting unit 200 together. The log information and the situation information may be accumulated with time according to conditions and locations. For example, when the user places the mobile terminal 100 on a desk in a room at a given time every day, the mobile terminal 100 may repeatedly obtain the same coordinate information at the same time and accumulate situation information in the data area on the basis of the location and time information. When the user plays back a specific music file at a location, the mobile terminal 100 may combine log information generated by music playback with situation information and store the combined information in the data area.

With continued reference to FIG. 1, the situation information collecting unit 200 includes at least one of a camera module 207, a sensor module 205, a short range communication module 203 and a location measurement module 201, and may further include the microphone MIC of the audio processing unit 130 and the radio frequency unit 110 as functional entities. In other words, the situation information collecting unit 200 may obtain approximate coordinates of the mobile terminal 100 through the location measurement module 201 or the radio frequency unit 110, and obtain other information through the remaining modules to provide situation information. More specifically, the situation information collecting unit 200 may obtain coordinate information of the mobile terminal 100 at a particular location through the location measurement module 201 or the radio frequency unit 110, obtain surrounding image information at the location through the camera module 207, obtain motion status information of the mobile terminal 100 at the location through the sensor module 205, obtain connection list information at the location through the short range communication module 203, and obtain audio information at the location through the microphone MIC. Thus, the situation information collecting unit 200 may obtain coordinate information and at least one of surrounding image information, motion state information, connection list information and audio information. Although, in the above description, the situation information collecting unit 200 uses coordinate information as a basis for obtaining other kinds of information, it may collect at least one of location information, state information and situation information of the mobile terminal 100 and send the collected information to the control unit 160. Here, the location information may indicate the coordinates of the mobile terminal 100 and the state information may indicate motion state thereof; and the situation information may include image information obtained in the surroundings of the mobile terminal 100 (surrounding image information), information related to a list of devices connectable through short-range communication (connection list information), and audio information obtained in the surroundings of the mobile terminal 100 (surrounding audio information).

In the situation information collecting unit 200, the sensor module 205 may include at least one of an acceleration sensor, proximity sensor, ambient light sensor, temperature sensor, humidity sensor, tilt sensor and gyro sensor, just to name some possible examples. The short range communication module 203 may be at least one of a Bluetooth communication module, an infrared communication module, a ZigBee communication module, and an FM communication module. The location measurement module 201 may comprise a GPS module. At least one module of the situation information collecting unit 200 may be activated when a given condition occurs, or can be continuously activated.

For example, when an information support mode is entered for terminal operation based on situation information, the location measurement module 201 may be activated to obtain coordinate information of the mobile terminal 100 in real time or at regular intervals. The mobile terminal 100 in the information support mode may obtain approximate coordinate information using base station information collected by the radio frequency unit 110, or obtain finer coordinate information using information collected by the radio frequency unit 110 from multiple base stations. When coordinate information obtained by the location measurement module 201 or the radio frequency unit 110 indicates preset coordinates, the camera module 207, the sensor module 205, the short range communication module 203 and the microphone MIC may be activated to collect respective surrounding image information, motion state information, connection list information and surrounding audio information.

In the information support mode, when one of various user functions includes invoking a call-related function, file playback function, file search function and broadcast reception function, the situation information collecting unit 200 may activate at least one component to obtain coordinate information through the location measurement module 201 or the radio frequency unit 110 and to collect at least one of surrounding image information, motion state information, connection list information and audio information. The situation information collecting unit 200 may be activated at regular intervals to obtain coordinate information and to collect at least one of surrounding image information, motion state information, connection list information and audio information.

With continued reference to FIG. 1, the situation information collecting unit 200 may use the sensor module 205 to control activation times of the remaining components. For example, upon entering the information support mode, the situation information collecting unit 200 may activate an acceleration sensor of the sensor module 205 to obtain sensing information, and, when the obtained sensing information matches a preset condition, activate at least one of the location measurement module 201, camera module 207, short range communication module 203, radio frequency unit 110 and microphone MIC to collect additional information using the activated component. Here, conditions such as "no motion for a given time", "continuous motion for a given time", and "generation of motion in a preset pattern" may be applied to the acceleration sensor. As described above, the situation information collecting unit 200 may use at least one of the radio frequency unit 110, location measurement module 201, microphone MIC, camera module 207, sensor module 205 and short range communication module 203 to collect information about the surrounding environment, and store the collected surrounding information as situation information. Thereafter, the situation information collecting unit 200 may collect log information related to the execution of user functions and store the log information together with the situation information. In other words, the history of utilization of the mobile terminal 100 at specific conditions (situations, locations, or states) is saved as situation information and log information. Subsequently, when the mobile terminal 100 encounters one of the recorded conditions, the saved utilization history matching the encountered condition is output, thereby enhancing a user's convenience in operating the mobile terminal 100.

The control unit 160 may control the overall operation of the mobile terminal 100, control signal exchange between the internal blocks, and control data processing. In particular, the control unit 160 preferably controls an operation to create situation information on the basis of at least one of coordinate information, surrounding image information, motion state information, connection list information and audio information collected from the situation information collecting unit 200, to obtain log information related to the use of the mobile terminal 100 at a location where the situation information is collected and in the vicinity thereof, and to store the log information and the situation information together. At a subsequent point in time when the mobile terminal 100 encounters one of a location, condition and state indicated as being the saved situation information, the control unit 160 may control an operation to output the saved log information conforming to the encountered situation.

Figure 2:
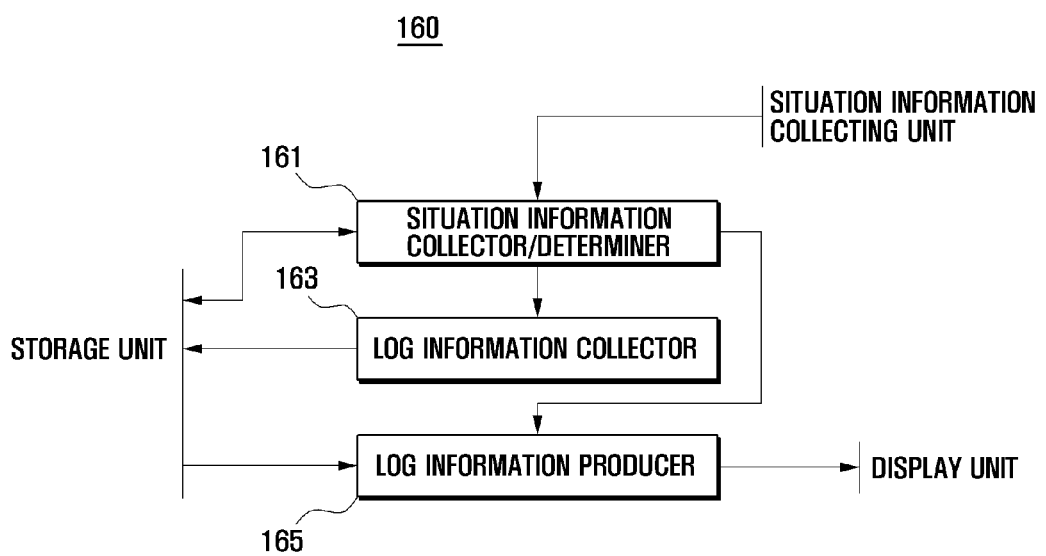
FIG. 2 depicts an exemplary configuration of a control unit of a mobile terminal according to the present invention.

In order to achieve this functionality at certain previously encountered situations, as shown in FIG. 2, the control unit 160 may include a situation information collector/determiner 161, a log information collector 163, and a log information producer 165. The control unit may comprise a microprocessor or special purpose processor/microprocessor.

The situation information collector/determiner 161 controls the activation time of the situation information collecting unit 200, and collects information from one or more components of the situation information collecting unit 200, and converts the collected information into situation information. One use of the situation information collector/determiner 161 can be to determine whether or not newly collected situation information matches situation information stored in the storage unit 150.

For example, when the situation information collecting unit 200 includes a location measurement module 201 and a camera module 207, the situation information collector/determiner 161 may control the location measurement module 201 to repeatedly obtain coordinate information of the mobile terminal 100 at regular intervals. When the coordinate information obtained by the location measurement module 201 remains the same for a preset time, the situation information collector/determiner 161 may activate the camera module 207 and control it to collect surrounding image information. The situation information collector/determiner 161 creates a piece of situation information using the coordinate information and surrounding image information. The situation information collector/determiner 161 may determine whether or not the newly created situation information matches situation information stored in the storage unit 150. When the newly created situation information does not match stored situation information, the situation information collector/determiner 161 may notify the log information collector 163 that the acquisition of new situation information has occurred. When the newly created situation information matches the stored situation information, the situation information collector/determiner 161 may notify the log information collector 163 and the log information producer 165 regarding the reacquisition of existing situation information.

In the above description, surrounding image information and coordinate information are used to create a piece of situation information. However, the presently claimed invention is not limited to the above description. In other words, the situation information collector/determiner 161 may create a piece of situation information on the basis of one or more of coordinate information, surrounding image information, terminal motion state information, connection list information related to external devices connectable through short-range communication, and audio information from the surroundings.

The log information collector 163 collects log information related to the currently active user function of the mobile terminal 100 upon reception of a piece of situation information from the situation information collector/determiner 161, and controls the storage unit 150 to store the received situation information and collected log information together. Herein, the log information may contain time data. For example, when a call-related function among the user functions is utilized, the corresponding log information may contain information on the type of the call (for example, incoming call, outgoing call, message, voice call, video call) and information on the occurrence time of the call. For storing situation information and log information, the log information collector 163 may use existing time data in the log information or time data provided by the mobile terminal 100. In storing situation information and log information, when newly collected situation information matches already stored situation information, the log information collector 163 may cause the corresponding information to be updated. For example, when situation information and log information collected on 2009-07-10 are present and new situation information collected on 2009-07-11 matches the existing situation information collected on 2009-07-10, the log information collector 163 may perform information update by adding new log information collected on 2009-07-11 to the existing log information collected on 2009-07-10.

Upon reception of situation information from the situation information collector/determiner 161, the log information producer 165 searches the storage unit 150 for existing situation information matching the received situation information, retrieves log information linked with the found situation information, and controls the display unit 140 to output the retrieved log information.

As described herein above, the mobile terminal of the present invention may finely identify specific locations, conditions, and states thereof to enhance functionality and enjoyment. The mobile terminal may store usage history at a particular location, condition and state, and output the stored usage history according to an encountered location, condition and state. The mobile terminal provides the user with usage histories in specific situations, and hence the mobile terminal provides a more flexible and convenient manner of use than known heretofore.

Figure 3:
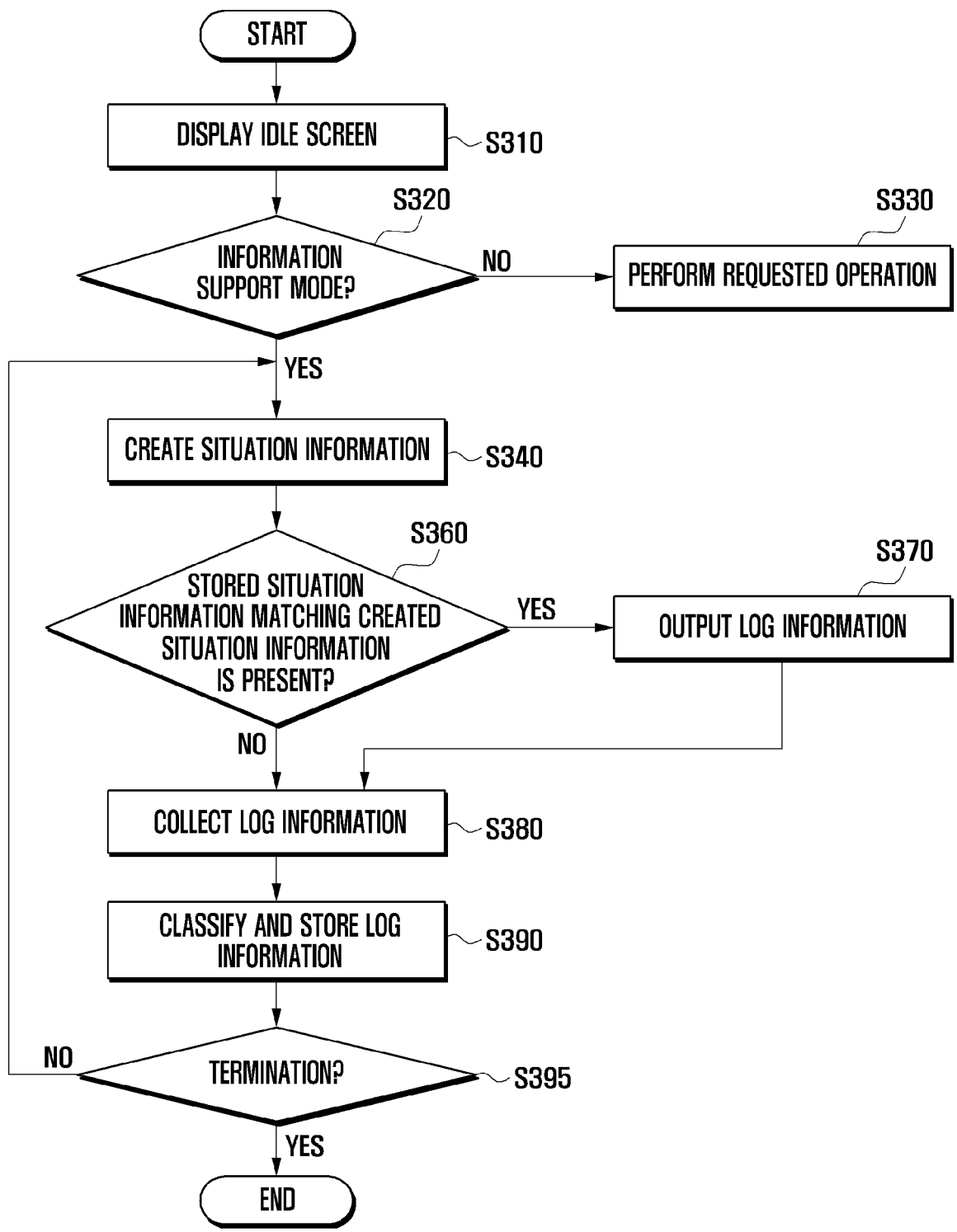
FIG. 3 is a flow chart illustrating an exemplary operation of the mobile terminal according to another exemplary embodiment of the present invention.

FIG. 3 is a flow chart illustrating exemplary operation of a method for providing the mobile terminal according to another exemplary embodiment of the present invention, in conjunction with an exemplary mobile terminal such as shown in FIG. 1.

Referring now to FIG. 3, when power is turned on, at (S310) the control unit of the mobile terminal initializes the internal components and causes output of a preset idle screen after initialization.

At (S320), the control unit checks whether or not a request for activating the information support mode is made. The mobile terminal may provide a menu or hot key for activating the information support mode related to location-based information output.

When at (S320) a request for activating the information support mode is not made, at (S330) the control unit performs an operation requested by the user. For example, the control unit may control invocation of one of various user functions related to, for example, call handling, camera photographing, broadcast reception, file playback, and file search according to an input signal from the input unit.

However, when at (S320) a request for activating the information support mode is made through a key input or default setting, then at (S340) the control unit controls an operation to create situation information on the basis of various pieces of information collected by the components. Here, the situation information may be composed of, for example, one or more of coordinate information, surrounding image information, terminal motion state information, connection list information related to external devices connectable through short-range communication, and audio information from the surroundings. At (S360), the control unit 160 (such as shown in FIGS. 1 and 2) checks whether or not situation information equal to or similar to the created situation information is present in the storage unit. Here, the similarity between new situation information and existing situation information may indicate the degree of sameness therebetween. For example, when new situation information and existing situation information are the same in coordinates and have a sameness degree of greater than or equal to 90 percent, they may be regarded as similar. This similarity may be set by the designer of the information support mode and may be reset/changed later by the user. The mobile terminal may optionally provide a separate menu for setting a value to the sameness degree for similarity between two pieces of information.

When situation information equal to or similar to the created situation information is present in the storage unit 150, at (S370) the control unit 160 controls the display unit 140 to output log information linked to the situation information. Here, the log information may be history information related to utilization of user functions of the mobile terminal.

When at (S370) situation information equal to or similar to the created situation information is not present in the storage unit (or after outputting log information, then at (S380) the control unit 160 causes collection of log information. Here, the log information may indicate utilization of user functions related to, for example, call processing, file playback, file search, broadcast reception and short range communication.

After collection of log information, at (S390) the control unit controls an operation to classify the log information according to given criteria and to store the classified log information. For example, when situation information does not change, multiple pieces of log information may be linked in order of time to the same situation information. As a result, the control unit may control an operation to link history information related to terminal usage with a specific piece of situation information, and to store the linked information in the storage unit.

Thereafter, at (S395) the control unit checks whether or not a request for terminating terminal use or the information support mode is made. When a request for termination is not made, the control unit returns to (S340) for continued processing.

Figure 4:
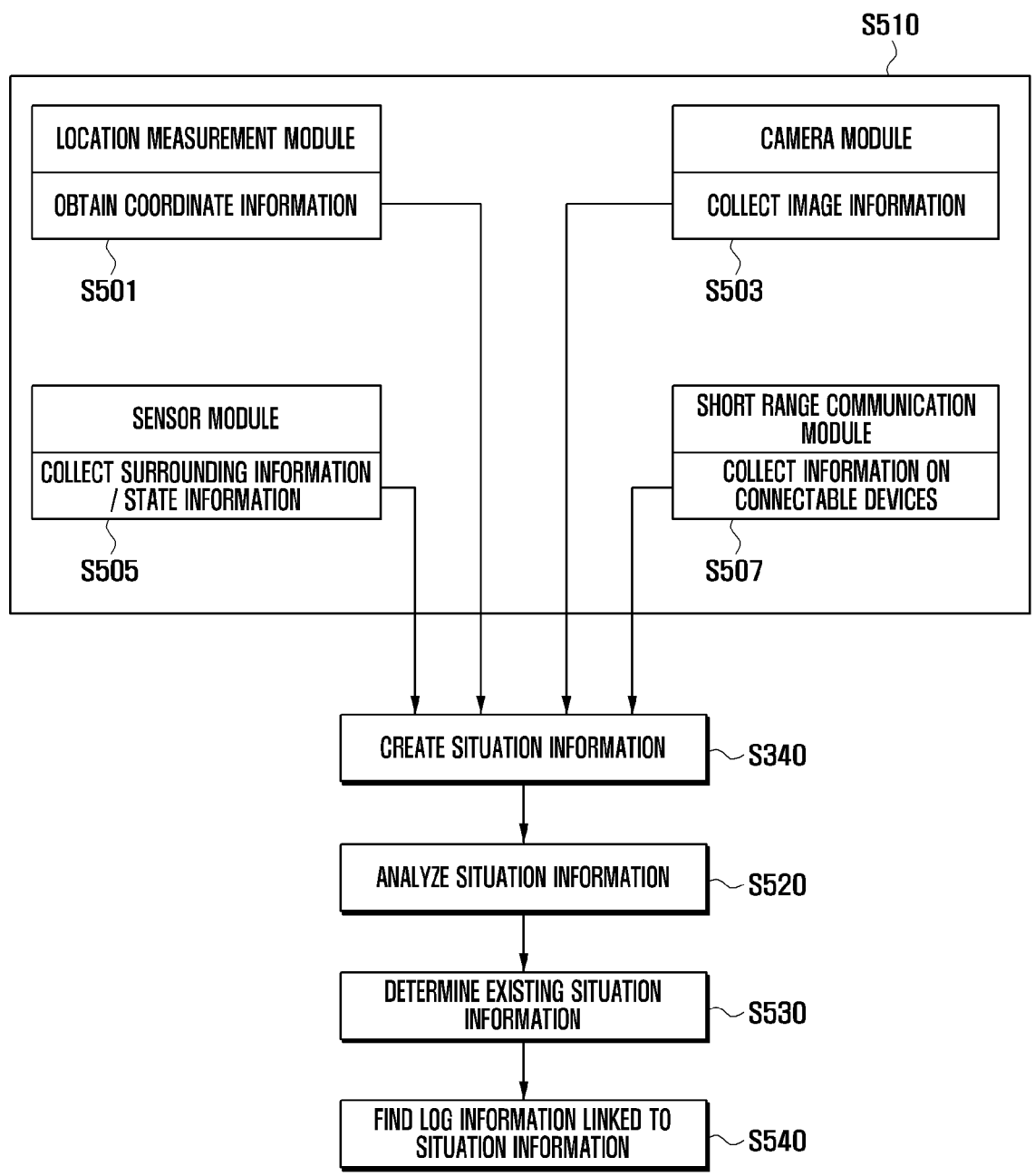
FIG. 4 depicts a procedure for collecting and analyzing situation information in the method exemplified in FIG. 3 according to an exemplary embodiment of the present invention.

FIG. 4 depicts a detailed procedure for collecting and analyzing situation information in the operation method of FIG. 3.

For the purpose of description, it is assumed that the situation information collecting unit includes a location measurement module, camera module, sensor module, and short range communication module. However, the presently claimed invention is not limited thereto. As described herein above, the situation information collecting unit may further include other components such as the radio frequency unit and microphone.

Referring now to FIG. 4, when the information support mode is activated, the control unit activates the internal components of the mobile terminal and controls the situation information collecting unit to collect information (S510). More specifically, the control unit may control the location measurement module to obtain coordinate information (S501), control the camera module to collect image information (S503), control the sensor module to collect information regarding the surroundings of the mobile terminal and to collect motion state information thereof (S505), and control the short range communication module to collect connection list information related to connectable external devices (S507). In this particular example, when the sensor module includes a temperature sensor and a humidity sensor, the control unit may control the temperature sensor and humidity sensor to obtain temperature information and humidity information at a specific location. Such information may become a portion of situation information. When the sensor module includes an acceleration sensor, the control unit may control the acceleration sensor to obtain information related to changes in motion state of the mobile terminal.

With continued reference to FIG. 4), after collecting various information at (S510), the control unit may create situation information on the basis of the collected information (S340). The control unit analyzes the situation information (S520). At (S520), the control unit may refer to existing situation information stored in the storage unit. In other words, the control unit checks whether or not situation information equal to or similar to the created situation information (S340) is present in the storage unit. When at (S530) it is determined that situation information equal to or similar to the created situation information is present in the storage unit, then at (S540) the control unit searches the storage unit for log information linked to the situation information. Thereafter, the control unit 160 may control the display unit 140 to output the found log information (S370 in FIG. 3).

When it is determined at (S530) that situation information equal to or similar to the created situation information is not present in the storage unit, the control unit 160 may regard the created situation information as new information, and skip step (S540) and perform step 5380 (in FIG. 3).

As described in the above exemplary operation, the method of the present invention permits the mobile terminal to accumulate and store log information related to utilization of user functions with reference to situation information. When the mobile terminal is placed at a location or condition indicated by the situation information, the operation method may control the mobile terminal to output the stored log information.

Figure 5:
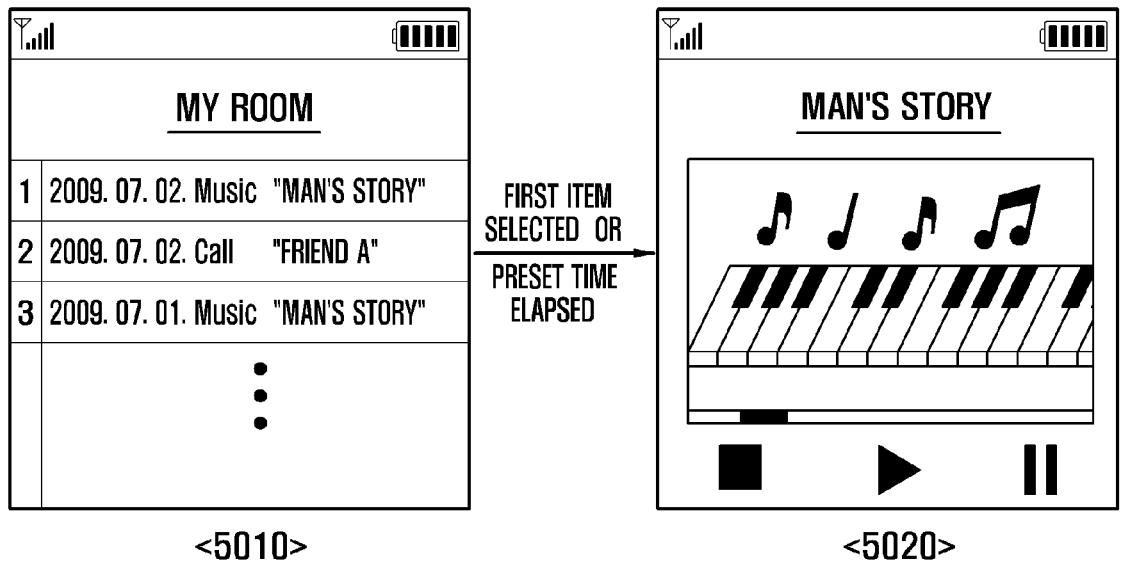
FIG. 5 illustrates sample screen representations for outputting log information.

FIG. 5 illustrates some non-limiting exemplary screen representations for outputting log information.

In the description, it is assumed that the mobile terminal handles situation information related to a location "my room". Here, the situation information related to "my room" may be composed of one or more items of coordinate information of "my room", surrounding image information captured at "my room", connection list information related to external devices connectable through short-range communication in "my room", sensing information obtained by the sensor module at "my room", and audio information generated in "my room".

In FIG. 5, the mobile terminal outputs a screen 5010 related to a situation "my room" that includes log information indicating playback of a music file "man's story" on 2009-07-01, log information indicating a call with "friend A" on 2009-07-02, and log information indicating playback of a music file "man's story" on 2009-07-02. When the current date is assumed to be 2009-07-03, the mobile terminal may be regarded as having a usage history indicating playback of music file "man's story" on 2009-07-01 and 2009-07-02 at a location named "my room".

Here, situation information "my room" may be edited by the user. There may be a specific condition for creation of situation information. For example, when the motion state of the mobile terminal is determined to be "no movement" for a preset time after the information support mode is activated, the mobile terminal may obtain coordinate information to create situation information. Or, the mobile terminal may control the camera module to capture surrounding image information at a location, and create situation information by combining coordinates of the location with the captured surrounding image information. After creation of situation information, the mobile terminal may output the situation information automatically or according to a user request. The user may name the situation information "my room" through editing.

When a first item (2009.07.02 music "man's story") is selected in the screen 5010, the mobile terminal may play back the corresponding music file as shown by a screen 5020. During music playback, the mobile terminal display the title of the music file ("man's story"), image information attached to the music file, and buttons for playback control (if a touch screen is equipped), on the display unit. Alternatively, when a preset time elapses after display of the screen 5010, the mobile terminal may perform an operation indicated by the latest log information (i.e. the first item).

Figure 6:
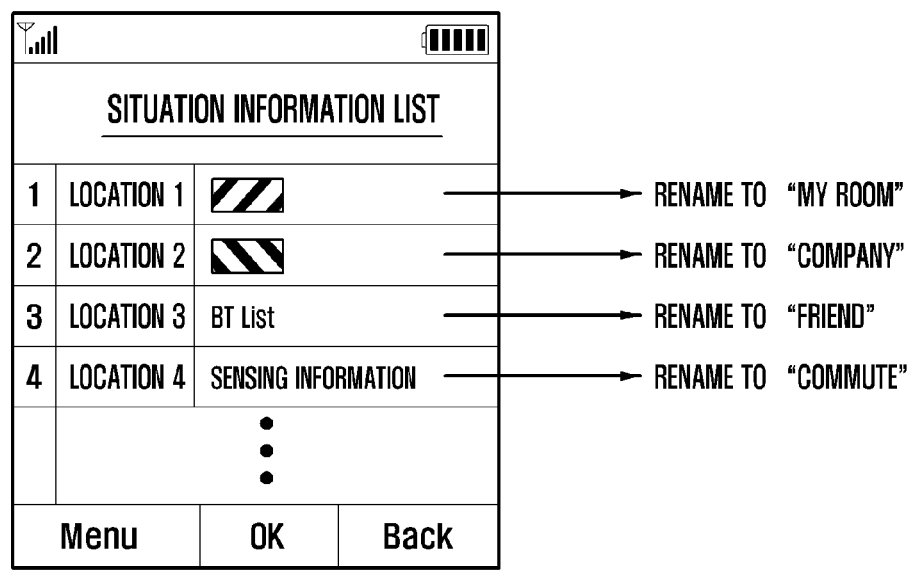
FIG. 6 illustrates a sample screen interface in which names are assigned to specific locations in a situation information list.

FIG. 6 illustrates a screen interface in which names are assigned to specific locations in a situation information list.

As previously described, when the mobile terminal is placed in a specific situation (location, state, or condition), it may create situation information using information collected in the situation. As shown in FIG. 6, the situation information list includes four items of the situation information: the first item may indicate coordinate information of "location 1" and surrounding image information captured by the camera module at "location 1"; the second item may indicate coordinate information of "location 2" and surrounding image information captured by the camera module at "location 2"; the third item may indicate coordinate information of "location 3" and a BT list of external devices connectable through the Bluetooth module at "location 3"; and the fourth item may indicate coordinate information of "location 4" and sensing information collected by the sensor module at "location 4". In the case of the fourth item, various sensors may be employed and various kinds of sensing information may be added to situation information.

The items of situation information may be edited by the user. For example, in FIG. 6, the first item may be renamed "My Room"; the second item may be renamed "Company"; the third item may be renamed "Friend", and the fourth item may be renamed "Commute". Here, naming for editing may be performed according to user preferences. Also, the name of list may be edited by the user. In the above description, coordinate information is combined with other types of information to create various situation information. According to user settings or components included in the mobile terminal, types of information available for creating situation information may vary.

FIG. 7 illustrates a data block composed of situation information and log information according to an exemplary embodiment.

In the following description with regard to FIG. 7, it is assumed that the situation information collecting unit includes a location measurement module such as a GPS module, a short range communication module such as a Bluetooth module, a camera module, and a microphone.

Referring now to FIG. 7, the data block may include multiple zones for storing information collected by individual elements of the situation information collecting unit. That is, the data block may include a GPS information zone for storing coordinate information of the mobile terminal obtained by the GPS module, a BT connection information zone for storing BT connection information obtained by the Bluetooth module, an image information zone for storing surrounding image information captured by the camera module, and an audio information zone for storing surrounding audio information collected by the microphone. These zones may be used for situation information. One or more of the zones may be empty (without data). For example, when no Bluetooth device is found in the vicinity, the BT connection information zone may be empty. When no audio information is collected in the surroundings, the audio information zone may be empty.

The data block may further include a log information zone for storing log information related to usage histories of the mobile terminal after collecting situation information. As shown in FIG. 7, log information may be stored in a table form reflecting usage histories of the mobile terminal. Specific indexes and values for the log information may be removed or changed according to the intention of the designer or user manipulation.

In summary, the mobile terminal of the present invention creates situation information on the basis of two or more types of information collected by various equipped components, such as a location measurement module like a radio frequency unit and GPS module, a sensor module for collecting information related to the motion state and the surroundings of the mobile terminal, a camera module for capturing surrounding image information, a short range communication module for finding connectable devices in the vicinity, and a microphone for collecting surrounding audio information. Creation of situation information may be triggered by one of a period, date and time, location, state and condition specified by an input signal from the input unit. In addition, the mobile terminal collects log information regarding usage histories of user functions from the time of or after creation of situation information. Here, the user functions may be related to call processing, camera photographing, broadcast reception, file search, file playback, and short range communication. The mobile terminal allocates a data block for storing the situation information and log information, and stores the data block in the storage unit as a database. Thereafter, when new situation information is created, the mobile terminal checks whether the new situation information is equal to or similar to pre-stored situation information. When the new situation information is equal to or similar to pre-stored situation information, the mobile terminal outputs log information linked to the pre-stored situation information. The mobile terminal may collect log information related to the current usage and store the collected log information in the storage unit as a data block. Here, the new log information may be added for accumulation to the existing log information linked to the same or similar situation information. When the new situation information is not equal to or similar to pre-stored situation information, the mobile terminal may combine newly collected log information with the new situation information and store the combined information in the storage unit as a new data block. Thereby, the mobile terminal may store or output log information related to usage histories according to at least one of a condition, location, and state indicated by situation information. Hence, the user may operate the mobile terminal in a more convenient way on the basis of past usage histories.

The above-described methods according to the present invention can be realized in hardware or as software or computer code that can be stored in a recording medium such as a CD ROM, a RAM, thumbnail drive, a floppy disk, a flash storage, a hard disk, or a magneto-optical disk or downloaded over a network, so that the methods described herein can be executed by such software using a general purpose computer, or a special processor, microprocessor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While exemplary embodiments of the present invention have been shown and described in this specification, it will be understood by those skilled in the art that various changes or modifications of the embodiments are possible without departing from the spirit and scope of the invention as defined by the appended claims.

What is claimed is:

1. A method for providing situational-based functionality for a mobile terminal, comprising:
   (a) creating situation information by a control unit on a basis of at least one of location information, status information and condition information of the mobile terminal;
   (b) collecting log information related to usage histories of the mobile terminal from a time situation information is created in (a) or within a preset time subsequent to the creation of situation information in (a); and
   (c) storing the situation information and the log information in a linked form in a storage unit to provide situationally-based functionality;
   wherein collecting log information includes collecting information regarding usage histories of user functions of the mobile terminal related to call processing, file search, file playback, broadcast reception, audio recording, and camera photographing.

2. The method of claim 1, wherein the mobile terminal displays an output of situationally-based functions corresponding to the stored linked information when the mobile terminal subsequently encounters a matching situational information determined by a situation information collector/determiner.

3. The method of claim 1, further comprising activating at least one of the situationally-based functions corresponding to most recently recorded log information.

4. The method of claim 1, further comprising outputting, when new situation information substantially equal to the stored situation information is created, log information linked to the stored situation information.

5. The method of claim 1, wherein the creation time of situation information is determined by at least one of a period, date and time, location, state and condition specified by an input signal from an input unit.

6. The method of claim 1, wherein creating situation information comprises at least one of
   (i) generating situation information by linking two or more of coordinate information of the mobile terminal, surrounding image information, surrounding audio information, connection list information related to short range communication, motion status information of the mobile terminal, and information regarding the surroundings of the mobile terminal; and
   (ii) obtaining one of coordinate information of the mobile terminal using a location measurement module or a radio frequency unit, surrounding image information using a camera module, sensing information using a sensor module, connection list information related to devices connectable through a short range communication module, and surrounding audio information using a microphone.

7. The method of claim 1, further comprising at least one of:
   outputting a list of items of the stored situation information; and
   changing the name of the list according to an input signal from an input unit.

8. A method for providing situational-based functionality for a mobile terminal, comprising:
   (a) creating situation information by a control unit on a basis of at least one of location information, status information and condition information of the mobile terminal;
   (b) collecting log information related to usage histories of the mobile terminal from a time situation information is created in (a) or within a preset time subsequent to the creation of situation information in (a); and
   (c) storing the situation information and the log information in a linked form in a storage unit to provide situationally-based functionality;
   outputting log information linked to the stored situation information when new situation information substantially equal to the stored situation information is created; and collecting, after log information output, new log information related to usage histories of the mobile terminal, and adding the new log information to the log information linked to the stored situation information for update;

automatically activating, when a preset time elapses after log information output, a user function of the mobile terminal indicated by the most recently recorded log information; and activating, when an item of the output log information is selected, a user function of the mobile terminal indicated by the selected item of the log information.

9. A mobile terminal comprising:

a situation information collecting unit for collecting at least one of location information, status information and condition information of the mobile terminal;

a control unit for creating situation information on a basis of the information collected by the situation information collecting unit, and for collecting log information related to usage histories of the mobile terminal from a time of creation of the situation information or within a preset time after situation information creation; and a storage unit for storing the situation information and log information in a linked form, wherein the control unit controls, when new situation information is created that substantially equals the stored situation information, output to a display unit of log information linked to the stored situation information;

wherein the control unit controls one of:

collecting by a log information collector, after log information output, new log information related to usage histories of the mobile terminal, and adding the new log information to log information linked to the stored situation information for update;

automatically activating, when a preset time elapses after log information output, a user function of the mobile terminal indicated by the most recently recorded log information; and activating, when an item of the output log information is selected, a user function of the mobile terminal indicated by the selected item of the log information.

10. The mobile terminal of claim 9, wherein the creation time of situation information is determined by at least one of a period, date and time, location, state and condition specified by an input signal from an input unit.

11. The mobile terminal of claim 9, wherein the situation information collecting unit comprises at least one of:

at least one of a camera module, a microphone, and a short range communication module to collect condition information;

one of a radio frequency unit and a location measurement module to collect location information; and a sensor module to collect status information.

12. The mobile terminal of claim 11, wherein the control unit creates situation information on a basis of at least one of coordinate information of the mobile terminal obtained using the location measurement module or radio frequency unit, surrounding image information captured using the camera module, sensing information collected using the sensor module, connection list information related to connectable devices obtained through the short range communication module, and surrounding audio information collected using the microphone.

13. The mobile terminal of claim 9, wherein the display unit outputs a list of items of the stored situation information according to an input signal.

14. The mobile terminal of claim 13, wherein the control unit changes the name of the list of items according to an input signal from an input unit.

15. The mobile terminal of claim 13, wherein the control unit changes the name of at least one item on the list of items according to an input signal from an input unit.

16. The mobile terminal of claim 9, wherein the control unit includes a situation information collector/determiner for controlling an activation time of the situation information collecting unit, and for collecting information from one or more components of the situation information collecting unit.

17. The mobile terminal of claim 16, wherein the situation information collector/determiner determines whether or not newly collected situation information matches situation information stored in the storage unit.

* * * * *